ial No. 499,526

United States Patent Office 2,892,673
Patented June 30, 1959

2,892,673
FAT-LIQUORING AGENTS FOR THE TREATMENT OF FUR SKINS AND PROCESS OF APPLYING THEM

Rudi Heyden and Jürgen Plapper, Dusseldorf, and Karl Raab, Goldbach, Germany, assignors to Bohme Fettchemie G.m.b.H., Dusseldorf, Germany, a corporation of Germany No Drawing. Application April 5, 1955
Serial No. 499,526

Claims priority, application Germany April 6, 1954

9 Claims. (Cl. 8—94.23)

This invention relates to fat-liquoring agents for the treatment of animal fur skins, and more particularly to emulsions adapted for use as fat-liquoring compositions in the manufacture of dressed animal fur skins.

We have found that emulsions composed of oils or fats, water-soluble or water-dispersible polyalkyleneoxide wax derivatives having lipophilic radicals in their molecules, and natural or synthetic waxes, represent fat-liquoring agents which are of great advantage in the manufacture of dressed fur skins.

As used in the present disclosure, the term "oils and fats" is intended to include not only animal, vegetable, and synthetic oils and fats, but also their derivatives, such as, for example, their sulfonated or sulfited derivatives. More specifically, this class of compounds comprises, among others, mineral oils, olein, train oils, tall oil, to mention only a few examples. Sulfonated or sulfited products of such oils and fats are, for example, Turkey-red oil, sulfonated neat's-foot oil, sulfonated or sulfited sperm oil or train oil, sulfonated vegetable oils, and sulfonates of mineral oils of natural or synthetic origin. In the case of the sulfonated fats and oils, the degree of sulfonation may be complete or only partially complete. Still further examples of derivatives are the fatty acid esters and fatty acid amides of these oils and fats.

The terms "water-soluble or water-dispersible polyalkyleneoxide wax derivatives having lipophilic radicals in their molecules," as used above, are intended to designate primarily condensation products which, in addition to the polyalkyleneoxide radical, contain high-molecular aliphatic, alicyclic, aliphatic-aromatic or cycloaliphatic-aromatic radicals having at least six carbon atoms in their molecules. The polyalkyleneoxide radical is preferably a polyethyleneoxide radical having a molecular weight of at least 1000, preferably between 5000 and 10,000.

Such condensation products can be obtained by various methods. For example, they may be produced by reacting ethyleneoxide or another alkyleneoxide, such as propyleneoxide, epichlorohydrin and the like, with high-molecular aliphatic, alicyclic or aliphatic-aromatic hydroxyl, carboxyl, mercapto, amino or acid amido compounds in the presence of catalyst until the desired degree of condensation and/or the desired molecular weight of the polyalkyleneoxide radical is reached. Examples of suitable high-molecular compounds for this purpose are hexylalcohol, octylalcohol, octylmercaptan, dodecylamine, cyclohexylalcohol, alkylcyclohexyl-alcohols, cyclohexylamine, naphthenic alcohols, benzylalcohol, ar-tetralol, alkylphenols, fatty acids containing from 7 to 9 carbon atoms, naphthenic acids, oleic acids, lauric acid amide, alkylbenzene-sulfonic acid amides, and the like. However, the condensation products may also be produced by etherifying polyalkyleneoxide waxes, such as, for example, polyethyleneoxide wax, with suitable hydroxyl compounds, or by esterifying polyalkyleneoxide waxes with suitable carboxylic acids.

However, other types of water-soluble or water-dispersible lipophilic polyalkyleneoxide wax derivatives may also be used in preparing the fat-liquoring emulsions according to the present invention. For example, those polyalkyleneoxide wax derivatives can advantageously be used which are obtained by a condensation reaction between polyalkyleneoxide waves, organic compounds having a high-molecular hydrocarbon radical and a readily exchangeable hydrogen atom in their molecules, and tri- or higher polyvalent organic and inorganic acids, as disclosed in co-pending application Serial No. 439,143, filed June 24, 1954. Similarly, those polyalkyleneoxide wax derivatives may be used which are obtained by a condensation reaction between polyalkyleneoxide waxes, oxo-compounds and compounds having a high-molecular hydrocarbon radical and a readily exchangeable hydrogen atom in their molecules, as disclosed in co-pending application Serial No. 466,459, filed November 2, 1954, now abandoned. Finally, still other polyalkyleneoxide wax derivatives which may be used in preparing the fat-liquoring emulsions in accordance with the present invention are those which are obtained by a condensation reaction between polyalkyleneoxide waxes and polycarboxylic acids having a lipophilic radical in their molecules, as disclosed in Serial No. 496,050, filed March 22, 1955.

The term "natural and synthetic waxes" is intended to designate such natural fatty substances as wool fat (degras), as well as natural and synthetic wax esters formed by a reaction between unsaturated fatty acids and fatty alcohols, such as the wax esters of marine animal oils.

In addition to the above components, the fat-liquoring emulsions according to the present invention may also contain any of the well-known emulsifying agents, especially alkylsulfates, alkylsulfonates, alkylbenzenesulfonates as well as other anionic, cationic or electroneutral surface-active compounds.

The fat-liquoring emulsions compounded in accordance with the present invention can be successfully employed as fat-liquoring agents in all stages of the manufacture of dressed fur skins; that is, they are equally well adapted for use as fat-liquoring agents in the dressing phase as for fat-liquoring the dressed skins during the finishing phase.

The emulsions disclosed herein are highly versatile fat-liquoring agents. For example, they are highly effective when used as fat-liquoring agents in both the brush method and the drum method. Furthermore, their use as a fat-liquoring additive for the bate solution is particularly advantageous, since the emulsions are highly resistant against break-down and decomposition in the presence of electrolytes. Finally, when the emulsions are employed as fat-liquoring agents for the dressed and dyed fur skins, equally good results are obtained whether they be applied to the skins by the brush method or the drum method. However, the latter method has the advantage that the hair can reabsorb natural fat from the fat-liquoring solution which it partially lost during the dyeing phase.

The fat-liquoring emulsions compounded in accordance with the present invention produce an excellent fatting or stuffing effect; the absorption and deposit of the fatty materials in the skins is so complete that the leather side of the fur skins retains its fabric-like softness and stretch even after being subjected to a clearing treatment with organic solvents. In most cases, the dressed skins do not require a subsequent fat-liquoring treatment. Even after extended storage in dry air, the finished fur skins retain the pleasant, plump feel. The high resistance of the emulsions against break-down in the presence of electrolytes makes them particularly desirable for use as fat-liquoring agents during the tanning phase of the skins, whereby a simultaneous tanning and fatting effect is achieved.

The fat-liquoring agents described above are used for the treatment of fur skins in concentrations customarily employed for this purpose. For example, if the skins are to be fat-liquored by the brush method, aqueous solutions are used which contain from 10 to 50% of our fat-liquoring agents. If necessary, these aqueous solutions may be further modified by the addition of up to 50 gm./liter of sodium chloride and/or 10 to 30 gm./liter of commercial chromium tanning agents or alum, in order to achieve a simultaneous tanning effect. Similarly, if the skins are to be fat-liquored by the drum method, the solution may contain 2.5-6 gm./liter of our fat-liquoring agents, and such solution may, if desired, also be modified with the customary amounts of alum or chromium tanning agents and/or with any desired quantities of common salt.

The fat-liquoring emulsions according to the present invention are well adapted for use in the treatment of all types of fur skins, such as, for example, rabbit, sheep, deer, marten, skunk, muskrat, Persian lamb and foal skins, as well as many others.

The following examples will further illustrate the nature of our invention and enable others skilled in the art to understand the present invention more completely. It will be understood, however, that these examples are given only for purposes of illustration and that our invention is not limited thereto.

Example I 90 parts by weight of a sperm oil derivative, produced by partially sulfonating sperm oil with 20% sulfuric acid and neutralizing the sulfonated product with ammonia, were admixed with 5 parts by weight of the distearic acid ester of a polyalkyleneglycol wax having a molecular weight of about 9000, and with 5 parts by weight of a 50% sodiumalkylsulfate paste wherein the alkyl radicals contained from 12 to 18 carbon atoms. This mixture was then warmed and 20 parts by weight of natural wool fat were blended into the warm mixture. Upon cooling, a salve-like paste was obtained which was found to be an excellent fat-liquoring agent for the treatment of all types of fur skins.

Substantially similar results were obtained when other esters of polyalkyleneoxide waxes were substituted for the distearic acid ester. For example, an excellent fat-liquoring composition for fur skins was formed when the above distearic acid ester of a polyalkyleneglycol wax was replaced by the corresponding montanic acid ester or an ester formed by a condensation reaction between a polyalkyleneoxide wax and a polycarboxylic acid produced by an addition reaction between maleic acid anhydride and oleic acid. Similarly, the ester mixture formed by a reaction between polyethyleneoxide wax and phosphoric or citric acid and stearylalcohol may be substituted for the distearic acid ester. Finally, equally good results were obtained when the above paste contained condensation products of a condensation reaction between polyethyleneoxide wax and stearylalcohol, stearylamine or stearic acid amide in the presence of formaldehyde, in place of the distearic acid ester of the polyalkyleneglycol wax.

Example II

Pickled sheep and lamb skins were placed into a tanning solution which contained 30 gm./liter common salt and 10 gm./liter of a commercial chromium tanning compound having a chromium oxide content of about 26%. The ratio of skins to solution was about 1:20. When required, the pH of the tanning solution was adjusted to between 3.2 and 3.5 with the aid of formic acid. After about two hours, 40 gm. per skin of the fat-liquoring emulsion described in Example I were added to the tanning solution. After two to three additional hours had elapsed, the pH of the combination fat-liquoring and tanning solution was adjusted to 3.8, and the fur skins were agitated overnight. The following morning the pH of the liquor was again adjusted to between 3.6 and 3.8. The tanned and fat-liquored fur skins were then removed from the liquor and centrifuged. The absorption and retention of the fat-liquoring agent in the dressed fur skins were excellent, and a subsequent fat-liquoring treatment was not required.

This method of simultaneous tanning and fat-liquoring not only produces excellent results, but is far less time-consuming than the separate brush-tanning and subsequent brush-fat-liquoring methods heretofore employed in the art.

Example III

The fat-liquoring agent disclosed in Example I was dissolved in water in a ratio of 1 part of fat-liquoring agent to 2 parts of water. One part of the resulting solution was then admixed with 2–2.5 parts of a solution containing 60 gm./liter common salt and 10–20 gm./liter of a commercial chromium tanning agent having a chromium oxide content of about 26%. The resulting emulsion was applied to dyed sheep and lamb skins by the brush method. The fat-liquoring and tanning emulsion was excellently absorbed and retained by the fur skins, producing a simultaneous fatting and tanning effect. The soft, pliable feel of the finished skins remained even after prolonged storage in dry air.

The above combination-fat-liquoring and tanning emulsion was also applied to dyed sheep and lamb skins by the paddle vat method. Substantially the same excellent results were obtained.

While we have given specific embodiments of our invention, we wish it to be understood that the invention is not limited to these embodiments and that various changes and modifications can be made therein without departing from the spirit of the invention or the scope of the appended claims.

We claim:

1. A fat-liquoring composition for treatment in aqueous medium of raw and dressed animal fur skins, consisting essentially of partially sulfonated neutralized sperm oil, the distearic acid ester of polyethyleneglycol wax having a molecular weight of about 9000, an alkali metal alkyl sulfate wherein the alkyl radical contains from 12 to 18 carbon atoms, and wool grease.

2. A fat-liquoring composition for treatment in aqueous medium of raw and dressed animal fur skins, consisting essentially of partially sulfonated neutralized sperm oil, the dimontanic acid ester of polyethyleneglycol wax having a molecular weight of about 9000, an alkali metal alkyl sulfate wherein the alkyl radical contains from 12 to 18 carbon atoms, and wool grease.

3. A fat-liquoring composition for treatment in aqueous medium of raw and dressed animal fur skins, consisting essentially of partially sulfonated neutralized sperm oil, an ester of a polyethyleneoxide wax produced by esterifying a polyethyleneoxide wax with a polycarboxylic acid formed by an addition reaction between maleic acid anhydride and oleic acid, said polyethyleneoxide wax having a molecular weight of about 9000, an alkali metal alkyl sulfate wherein the alkyl radical contains from 12 to 18 carbon atoms, and wool grease.

4. A fat-liquoring composition for treatment in aqueous medium of raw and dressed animal fur skins, consisting essentially of partially sulfonated neutralized sperm oil, a mixed ester of a polyethyleneoxide wax produced by esterifying a polyethyleneoxide wax having a molecular weight of about 9000 with an acid selected from the group consisting of phosphoric acid and citric acid and with stearylalcohol, an alkali metal alkyl sulfate wherein the alkyl radical contains from 12 to 18 carbon atoms, and wool grease.

5. A fat-liquoring composition for treatment in aqueous medium of raw and dressed animal fur skins, consisting essentially of partially sulfonated neutralized sperm oil, a condensation product produced by a condensation reaction between polyethyleneoxide wax having a molecular weight of about 9000, formaldehyde and a compound selected from the group consisting of stearylalcohol, stearylamine and stearic acid amide, an alkali metal alkyl sulfate wherein the alkyl radical contains from 12 to 18 carbon atoms, and wool grease.

6. A fat-liquoring composition for treatment in aqueous medium of raw and dressed animal fur skins, comprising neutralized sulfonated sperm oil, a water-miscible fatty acid ester of a polyethyleneoxide wax having a molecular weight of 1000 to 10,000, wherein the fatty acid radical has from 6 to 29 carbon atoms, and wool grease.

7. A fat-liquoring composition for treatment in aqueous medium of raw and dressed animal fur skins, comprising (1) neutralized sulfonated sperm oil, (2) a water-miscible polyethyleneoxide wax compound selected from the group consisting of (a) a fatty acid ester of polyethyleneoxide wax having a molecular weight of from 1,000 to 10,000, wherein the fatty acid radical has from 6 to 29 carbon atoms, (b) an ester mixture formed by reacting a polyethylene oxide wax having a molecular weight of from 1,000 to 10,000 with a polybasic acid selected from the group consisting of phosphoric and citric acids and a fatty alcohol having from 6 to 29 carbon atoms in the fatty radical, and (c) a condensation product of a polyethyleneoxide wax having a molecular weight of from 1,000 to 10,000 with formaldehyde and a fatty radical compound selected from the group consisting of fatty alcohols, fatty amines and fatty acid amides, wherein the fatty radicals have from 6 to 29 carbon atoms, and (3) wool grease.

8. An aqueous emulsion for fat-liquoring of raw and dressed animal fur skins consisting essentially of (1) water, (2) neutralized sulfonated sperm oil, (3) a water-miscible fatty acid ester of a polyethyleneoxide wax having a molecular weight of 1,000 to 10,000, wherein the fatty acid radical has from 6 to 29 carbon atoms, (4) an alkali metal alkyl sulfate wherein the alkyl radical contains from 12 to 18 carbon atoms, and (5) wool grease.

9. The method of fat-liquoring raw and dressed animal fur skins which comprises contacting said fur skins with an aqueous emulsion consisting essentially of (1) water, (2) neutralized sulfonated sperm oil, (3) a water-miscible fatty acid ester of a polyethyleneoxide wax having a molecular weight of 1,000 to 10,000, wherein the fatty acid radical has from 6 to 29 carbon atoms, (4) an alkali metal alkyl sulfate wherein the alkyl radical contains from 12 to 18 carbon atoms, and (5) wool grease.

References Cited in the file of this patent

UNITED STATES PATENTS

| | | |
|---|---|---|
| 2,456,587 | Koppenhoefer | Dec. 14, 1948 |
| 2,496,641 | Schiller et al. | Feb. 7, 1950 |
| 2,692,180 | Schmitt et al. | Oct. 19, 1954 |